Figure 1:
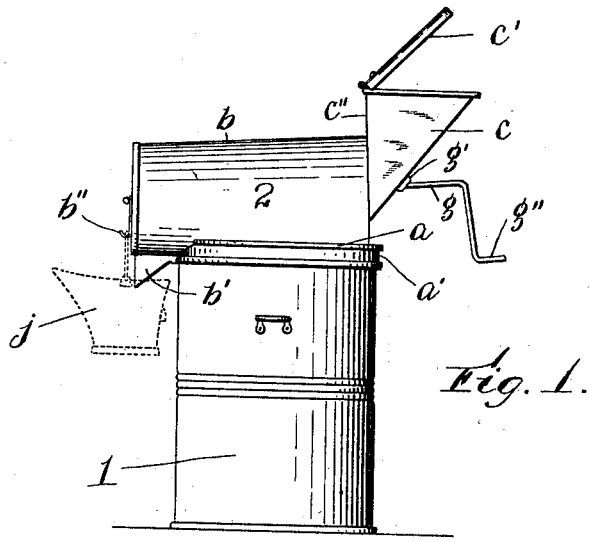

No. 758,032. PATENTED APR. 19, 1904.
J. P. HILL.
ASH SIFTER.
APPLICATION FILED FEB. 4, 1903.
NO MODEL.

Witnesses:
C. F. Wescon.
M. Haas.

Inventor:
J. P. Hill.
By his Attorney
John C. Dewey.

No. 758,032. Patented April 19, 1904.

UNITED STATES PATENT OFFICE.

JOSEPH P. HILL, OF WORCESTER, MASSACHUSETTS.

ASH-SIFTER.

SPECIFICATION forming part of Letters Patent No. 758,032, dated April 19, 1904.

Application filed February 4, 1903. Serial No. 141,844. (No model.)

*To all whom it may concern:*

Be it known that I, JOSEPH P. HILL, a citizen of the United States, residing at Worcester, in the county of Worcester and State of Massachusetts, have invented certain new and useful Improvements in Ash-Sifters, of which the following is a specification.

My invention relates to ash-sifters; and the object of my invention is to improve upon the ordinary construction of ash-sifters and to make an ash-sifter of very simple construction and operation and preferably adapted to be placed on top of an ash barrel or can and to have the ashes poured into one end of the sifter and pass into the open end of a rotary sieve, which is in an inclined position, to be sifted into the barrel or can and the coal or clinkers too large to be sifted to pass out of the other open end of the inclined rotary sieve through a chute or opening into a coal-hod or other receptacle.

In my improved ash-sifter the rotary sieve is of uniform diameter throughout its length and is supported in an inclined position in the direction of its length. The opening in the receiving end of the ash-sifter leading into the upper open end of the rotary sieve is of circular shape and of substantially the same size as the diameter of the rotary sieve.

The ashes poured into the sifter fall or are guided into the lower part of the upper open end of the rotary sieve at the point where the end of the rotary sieve meets the inner side of the receiving end of the sifter, and if there is any space or opening between the upper end of the sieve and the inner side of the receiving end of the sifter the ashes will drop into this space and clog and interfere with the free rotary motion of the sieve.

The object of my improvements is to prevent the ashes from clogging or interfering with the free rotary motion of the sieve, as above described.

In my improvements I provide the circular opening in the inner side of the receiving end of the ash-sifter leading into the upper open end of the rotary sieve with a flange or projection which extends into the upper open end of the sieve and fits loosely within the ring forming the end of the rotary sieve, which ring has supporting-arms and a hub secured on a rotatable shaft, and to the outer periphery of said ring is secured the wire mesh or netting forming the sieve. The flange or projection on the circular opening extending loosely within the ring at the upper open end of the rotary sieve closes the space or opening between the upper end of the sieve and the inner side of the receiving end of the ash-sifter and forms a surface extending within the open end of the rotary sieve at its lower part, on which the ashes poured into the receiving end fall, as will be hereinafter fully described.

My invention consists in certain novel features of construction of my ash-sifter, as will be hereinafter fully described.

Figure 2:
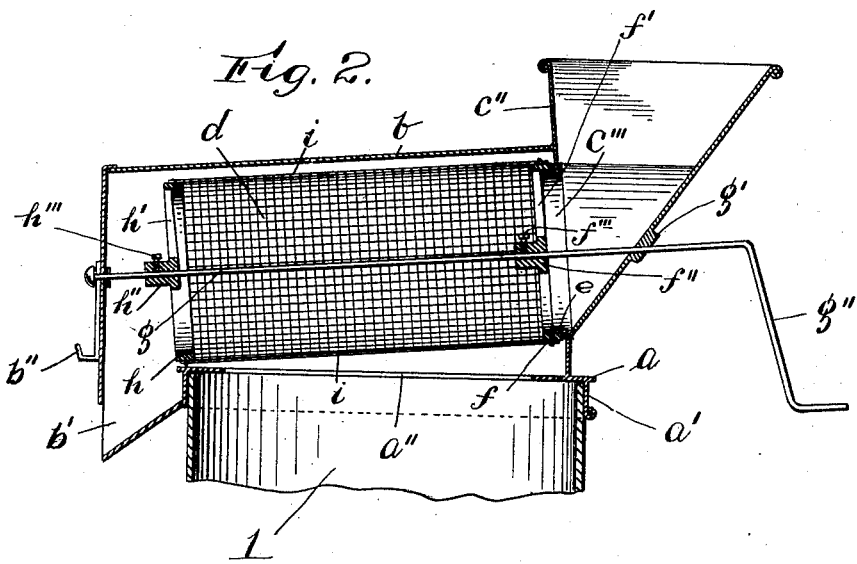
Figure 3:
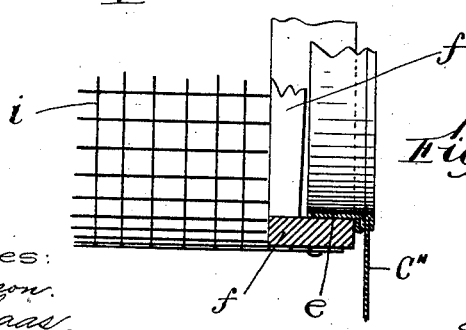

Referring to the drawings, Figure 1 is a side view of an ash-sifter embodying my improvements, shown on the top of a metal ash-can. A coal-hod to receive the material which does not pass into the ash-can is shown by broken lines. Fig. 2 is, on an enlarged scale, a central vertical section through the ash-sifter and upper part of the ash-can shown in Fig. 1; and Fig. 3 shows, on an enlarged scale, a sectional detail of a detached portion of the inner side of the receiving end of the ash-sifter and the opening leading therefrom and of the upper open end of the rotary sieve.

In the accompanying drawings, 1 is an ash can or receptacle, which may be of any ordinary construction and adapted to receive the sifted ashes.

2 is an ash-sifter embodying my improvements and comprising the base portion $a$, preferably of circular shape and with a downwardly-extending flange $a'$ and the large central opening $a''$. The base $a$ is adapted to fit onto the top of the ash can or receptacle 1 to support and hold the ash-sifter in place thereon, as shown.

The upper part of the ash-sifter 2 is supported on the lower part or base $a$ and is preferably of cylindrical shape in cross-section and inclined toward the discharging end of the sifter, as shown. To one end of the cylindrical portion $b$ is secured the inner side of the receiving end $c$, which preferably has a flaring open end at its upper part provided with a hinged cover $c'$. The inner side $c''$ of the receiving end $c$ has a circular opening $c'''$ therethrough of a diameter a little less than the diameter of the rotary sieve $d$. The edge of the circular opening $c'''$ is preferably reinforced or stiffened by turning over the edge of the side $c''$ around the opening, as shown in Fig. 3. Combined with the edge of the circular opening $c'''$ in the inner side $c''$ of the receiving end $c$ is a flange or projection $e$, preferably made separate from the side $c''$ and secured upon the outside of the side $c''$ by solder or otherwise, as shown in Fig. 3. The flange or projection $e$ preferably extends entirely around the opening $c'''$ and within the upper open end of the rotary sieve $d$. The rotary sieve $d$ is preferably of cylindrical shape and of uniform diameter and extends in an inclined position within the cylindrical portion $b$. At the upper open end of the sieve $d$ is a ring $f$, forming the upper end of the sieve. The ring $f$ has two or more arms $f'$ connecting it with a hub $f''$, which is mounted on and secured by a set-screw $f'''$ to an inclined shaft $g$, having bearings at $g'$ in the receiving end $c$ and the end of the cylindrical portion $b$. The shaft $g$ has its upper end in this instance bent to form a handle $g''$ outside of and at the upper end of the ash-sifter, by means of which the sieve $d$ is rotated. Within the ring forming the upper open end of the rotary sieve $d$ extends loosely the flange or projection $e$ around the opening $c'''$ in the side $c''$, as shown in Figs. 2 and 3. The flange or projection $e$ closes any space or opening between the upper end of the rotary sieve $d$ and the inner side $c''$ of the receiving end $c$ and also forms a surface at the lower part of the upper open end of the sieve $d$, on which the ashes fall and are guided into the open end of the sieve $d$. The rotary sieve $d$ has at its lower end a ring $h$, having arms $h'$ and a hub $h''$, secured by a set-screw $h'''$ on the inclined shaft $g$. The ring $h$ forms the lower end of the rotary sieve $d$. Upon the peripheries of the rings $f$ and $h$ is secured the wire mesh or netting $i$, forming the body of the sieve $d$. The lower open end of the sieve $d$ opens into the lower end of the cylindrical part $b$, which has a discharging-chute $b'$. A hook $b''$ may be provided on the outside of the part $b$ to support a coal-hod $j$ or other receptacle.

The operation of my ash-sifter will be readily understood by those skilled in the art. The ashes are poured into the flaring open end of the receiving end $c$ of the ash-sifter and pass by gravity into the upper open end of the rotary sieve $d$. The flange or projection $e$ around the opening $c'''$ in the inner side $c''$ and extending into the upper open end of the sieve $d$ forms a surface upon which the ashes fall and also a guide to direct the ashes into the sieve, and said flange $e$ closes any space or opening between the inner side $c''$ and the upper end of the sieve $d$, and thus prevents the ashes from getting into said space and clogging or interfering with the free rotary motion of the sieve $d$. The turning of the handle $g''$ causes the sieve $d$ to rotate and the ashes to be sifted into the ash-can 1, and the inclined position of the sieve $d$ causes the coarser material not sifted to pass out of the lower open end of the sieve and be discharged through the chute $b'$ into the coal-hod $i$ or other receptacle.

It will be understood that the details of construction of my improvements may be varied, if desired. The ash-sifter instead of being placed on an ash-can may be connected with an ash-chute, such as are ordinarily used.

I prefer to have the flange $e$ extend entirely around the opening $c'''$ in the side $c''$ of the receiving end $c$, as shown in Fig. 2; but it may only extend around the lower part of said opening $c'''$.

Having described my invention, what I claim as new, and desire to secure by Letters Patent, is—

1. In an ash-sifter, the combination with the external cylindrical case for the rotary sieve, the said sieve extending in an inclined position within the external case, and with its upper and lower ends open and supported on and secured to an inclined shaft through rings having hubs thereon mounted on the said shaft, the said cylindrical case having a receiving end and a discharge end, the said receiving end having a flaring open end and a circular opening provided on its inner side communicating with the upper end of said cylindrical case, the edge of the inner side around the said circular opening being turned over to reinforce the said opening and a flange secured in the said opening and extending into the upper part of the said sieve, the inner periphery of the upper of said supporting-rings of said sieve engaging the outer surface of the said flange and the outer edge of the said ring engaging the said turned-over portion around the central opening and being held in the said position and against lateral movement by the screw mounted in the lower of said hubs and engaging the said shaft.

2. In an ash-sifter, the combination of a cylindrical case supported on a circular base, the said base portion having a downwardly-extending flange provided thereon to engage the top of the receptacle and a central opening formed therein communicating with the interior of said receptacle, a receiving and discharge end, connected to the open ends of said case and formed integral with the said base portion, an inclined shaft having supporting-bearings in the said receiving and discharge ends and a rotary sieve having its upper and lower ends open and supported on and secured to the said shaft through rings attached to hubs mounted on the said shaft, said receiving end of the case having a circular opening adjacent the receiving end of the sieve, the walls of said circular opening being turned over to reinforce the said opening, a flange secured in the said opening and extending into the upper part of the said sieve, the inner periphery of the upper of said supporting-rings of said sieve engaging the outer surface of the extended portion of said flange and the outer edge of said ring engaging the said turned-over portion around the central opening forming a dust-proof joint, the said ring being held against lateral movement by a screw mounted in the lower of said hubs and engaging the said shaft.

J. P. HILL.

Witnesses:
    J. C. DEWEY,
    M. HAAS.